United States Patent
Akiba et al.

(10) Patent No.: US 8,368,353 B2
(45) Date of Patent: Feb. 5, 2013

(54) SECONDARY BATTERY DEVICE AND VEHICLE

(75) Inventors: Takashi Akiba, Kawasaki (JP); Mami Mizutani, Hachioji (JP); Fumiyuki Yamane, Kawasaki (JP); Yuki Kuwano, Fuchu (JP); Ryuichi Morikawa, Higashimurayama (JP); Shuji Ono, Tokyo (JP); Nobuo Shibuya, Hiratsuka (JP); Kazuto Kuroda, Yokohama (JP); Shinichiro Kosugi, Saku (JP); Yasuhiro Miyamoto, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 322 days.

(21) Appl. No.: 12/872,257

(22) Filed: Aug. 31, 2010

(65) Prior Publication Data

US 2011/0050169 A1    Mar. 3, 2011

(30) Foreign Application Priority Data

Aug. 31, 2009 (JP) .................................. 2009-200858
Sep. 30, 2009 (JP) .................................. 2009-228137
Jul. 7, 2010 (JP) .................................. 2010-155139

(51) Int. Cl.
*H02J 7/00* (2006.01)
*H05K 7/14* (2006.01)
*B60K 1/00* (2006.01)

(52) U.S. Cl. ........ 320/109; 320/104; 320/116; 320/139; 307/149; 307/10.1; 180/65.1; 180/65.21

(58) Field of Classification Search .................... 320/109
See application file for complete search history.

(56) References Cited

U.S. PATENT DOCUMENTS

| | | | |
|---|---|---|---|
| 7,405,541 B2* | 7/2008 | Inokuchi et al. | 322/8 |
| 7,471,064 B2* | 12/2008 | Sobue et al. | 320/116 |
| 2005/0194931 A1* | 9/2005 | Sobue et al. | 320/116 |
| 2005/0242775 A1* | 11/2005 | Miyazaki et al. | 320/116 |
| 2006/0132085 A1* | 6/2006 | Loubeyre | 320/104 |
| 2009/0055157 A1* | 2/2009 | Soffer | 703/27 |
| 2009/0066291 A1* | 3/2009 | Tien et al. | 320/118 |

FOREIGN PATENT DOCUMENTS

| | | |
|---|---|---|
| JP | 11-150877 | 6/1999 |
| JP | 2001-178003 | 6/2001 |
| JP | 2007-244142 | 9/2007 |

* cited by examiner

*Primary Examiner* — Yalkew Fantu
(74) *Attorney, Agent, or Firm* — Oblon, Spivak, McClelland, Maier & Neustadt, L.L.P.

(57) ABSTRACT

According to one embodiment, the power supply management portion includes a timer configured to output an ON signal every time set by the control circuit, an OR circuit configured to receive supply of an output signal from the timer, an external signal supplied from outside, and a switch control signal output from the control circuit, and a switch circuit configured to switch output of the power source voltage from an external power source according to an output signal from the OR circuit, and the control circuit turns on a switch control signal after confirming which of the output signal from the timer or the external signal has turned on the switch circuit and turns off the switch control signal when both of the output signal from the timer and the signal supplied from outside are turned off.

14 Claims, 12 Drawing Sheets

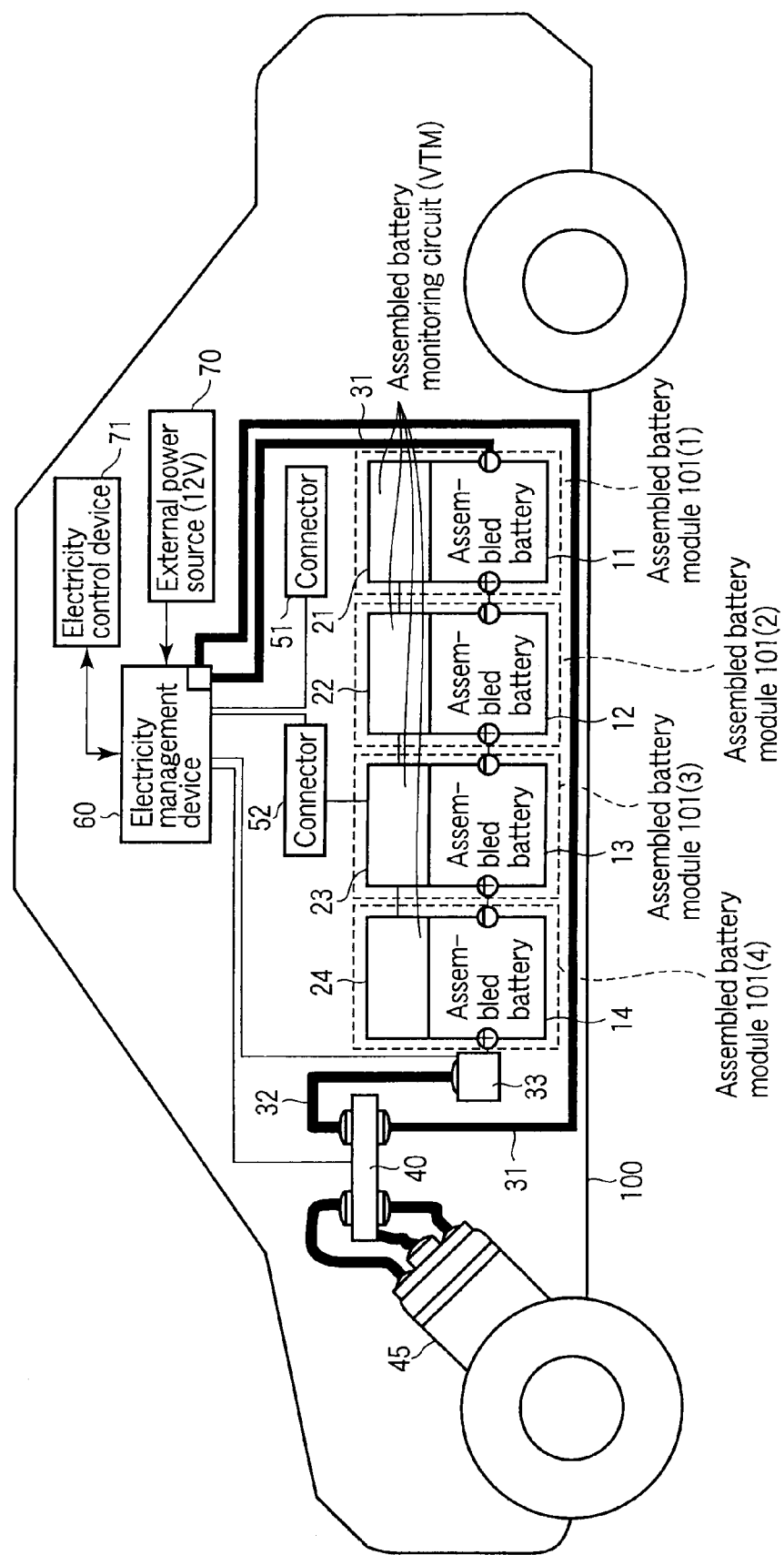
F I G. 1

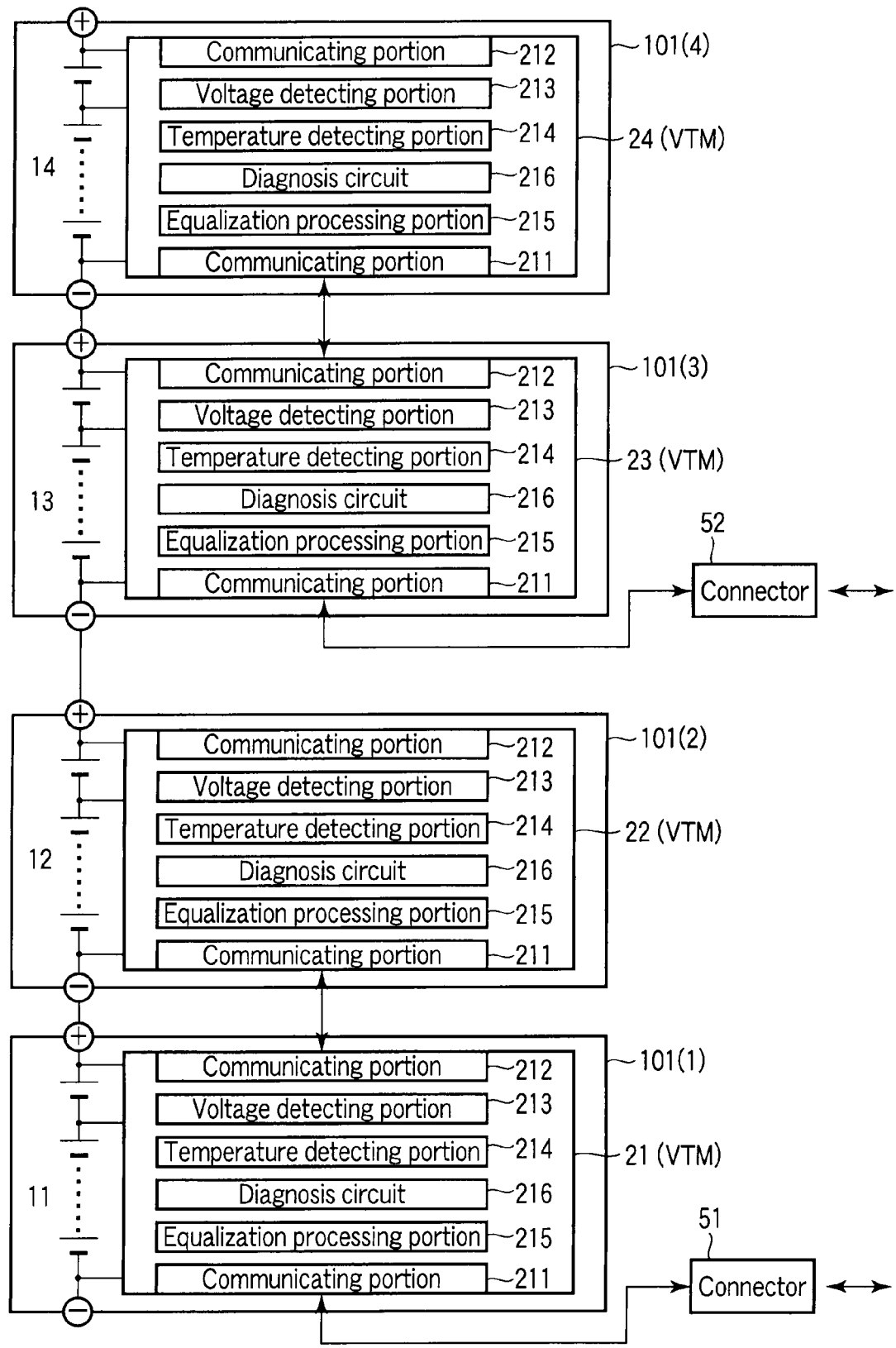
F I G. 2

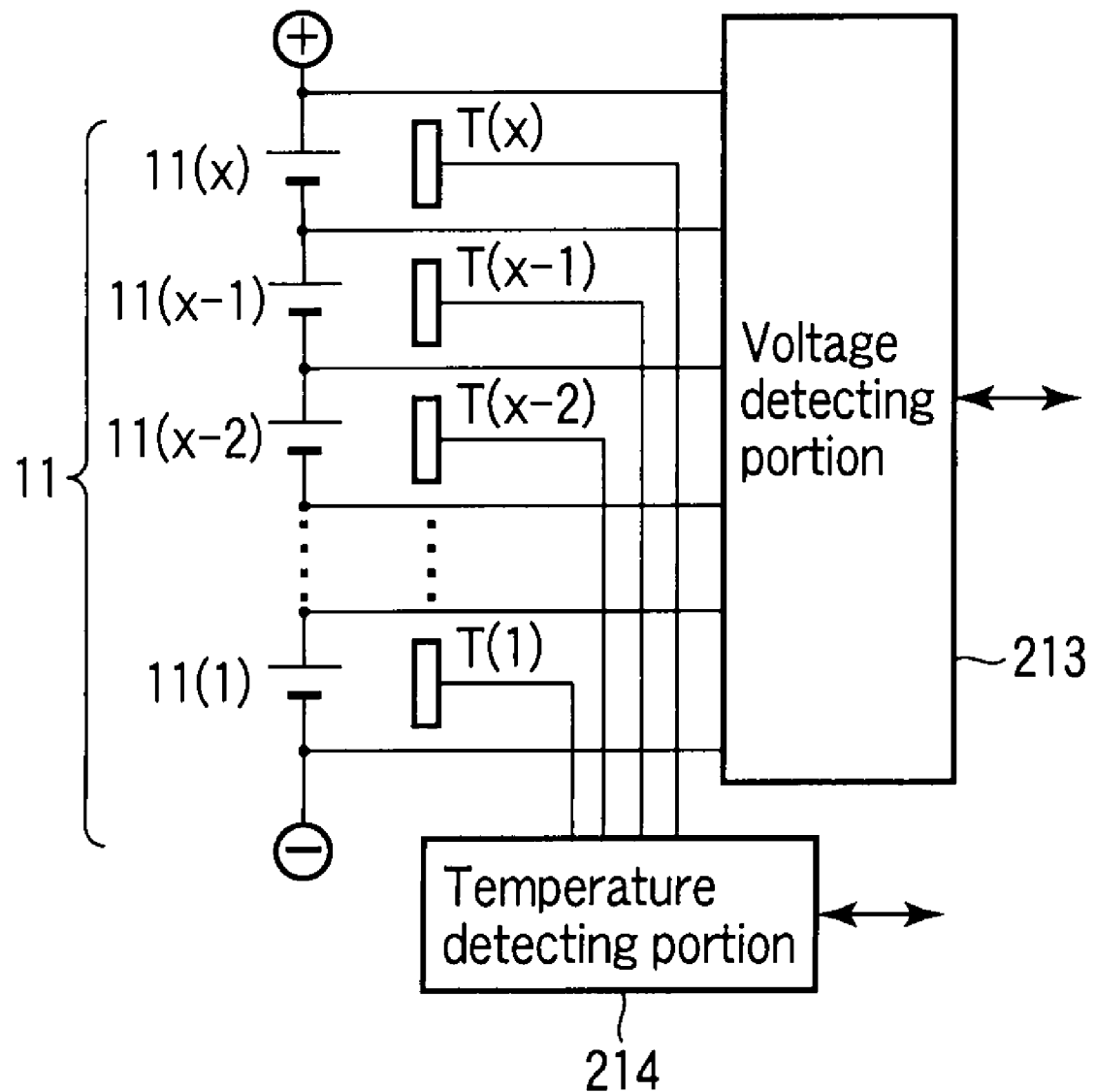
F I G. 3

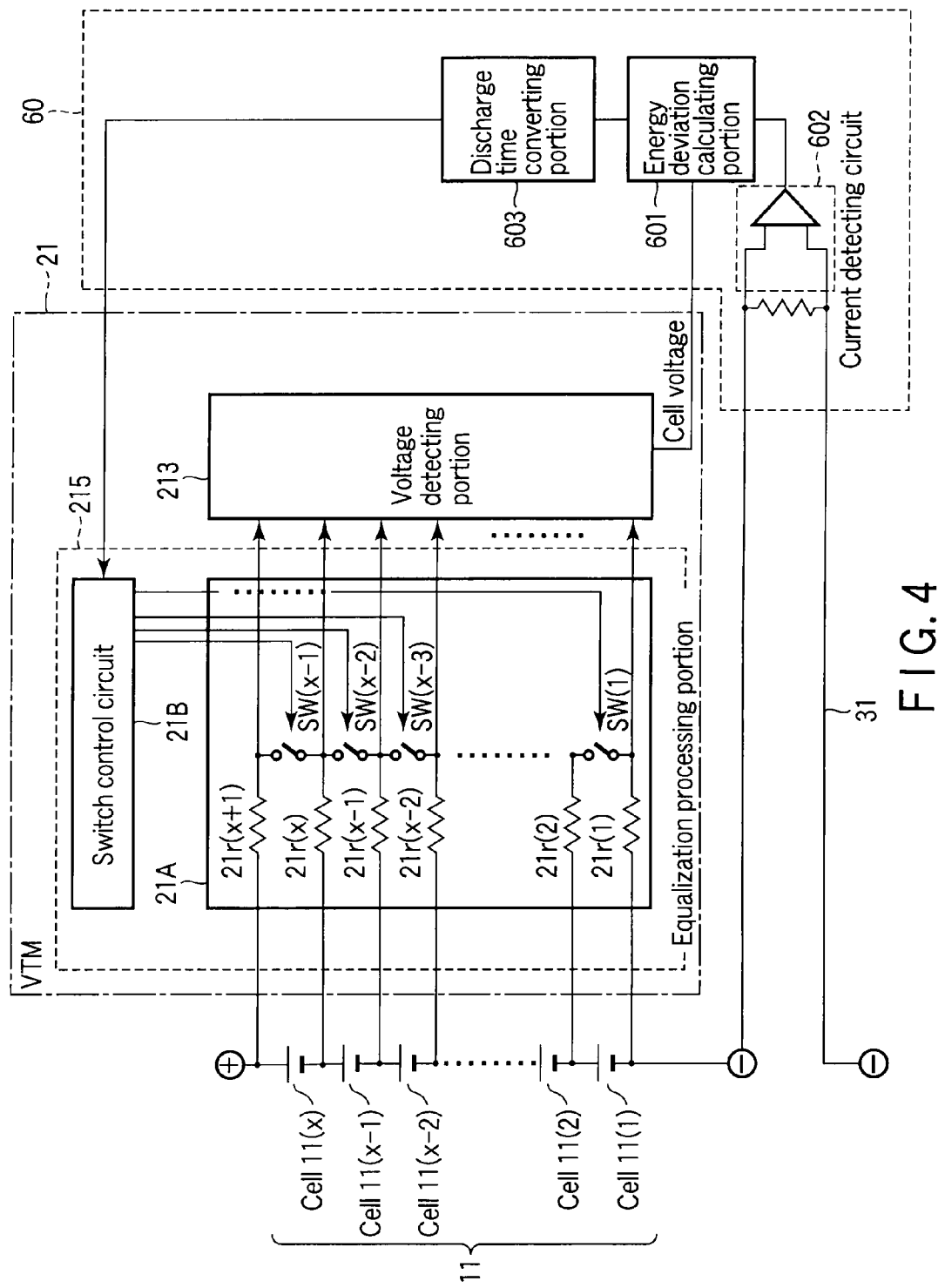
F I G. 4

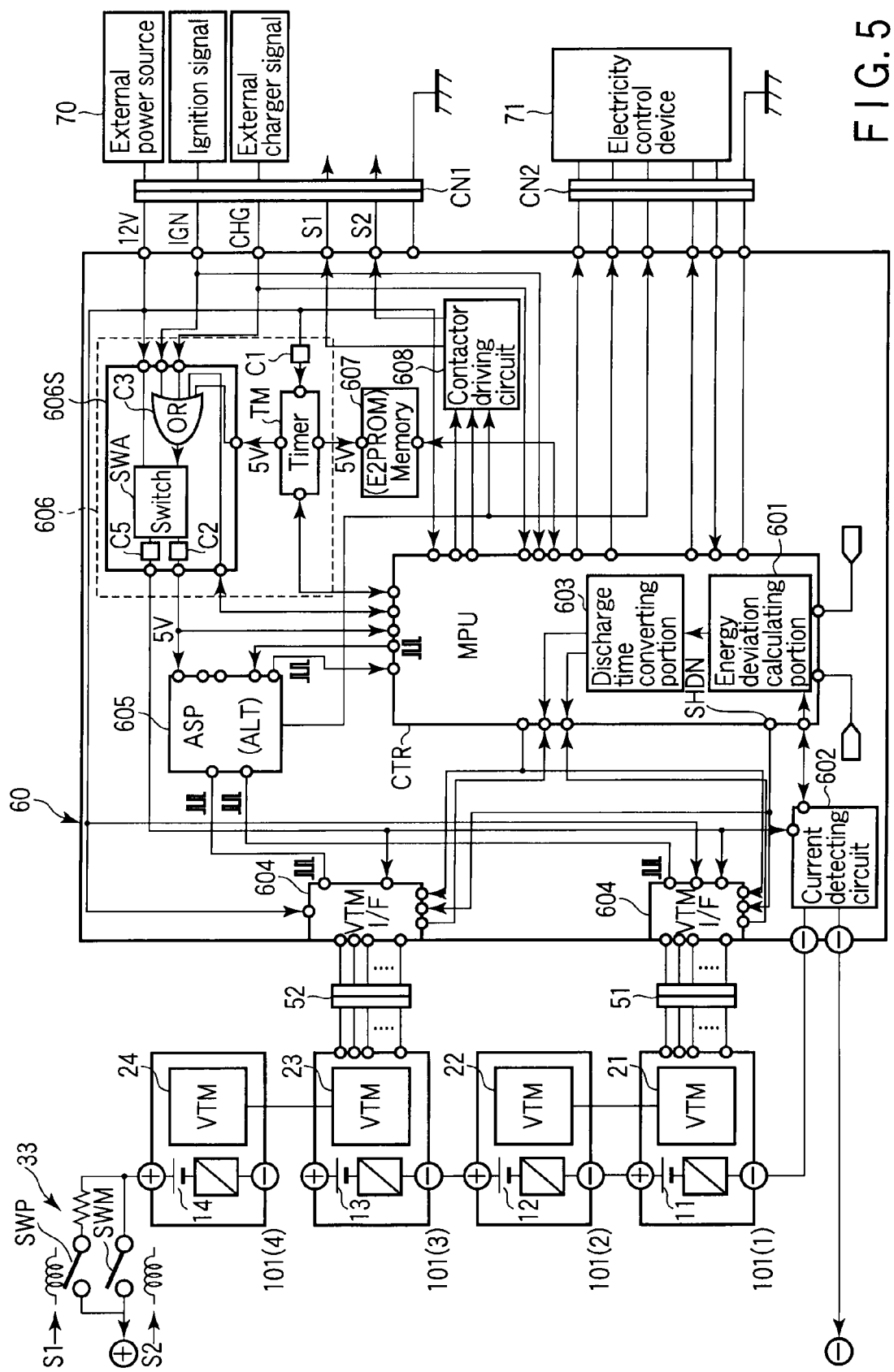
F I G. 5

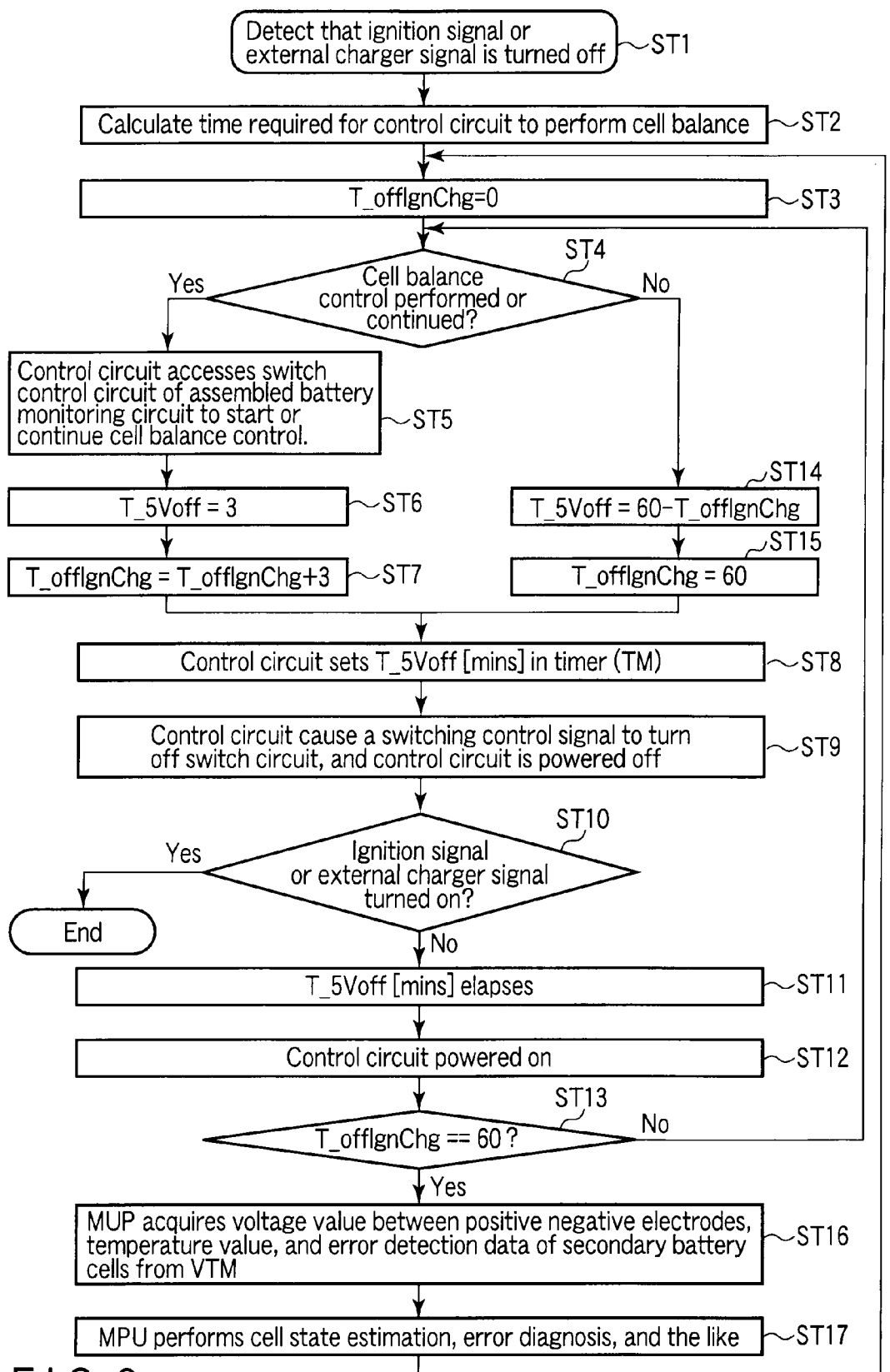
F I G. 8

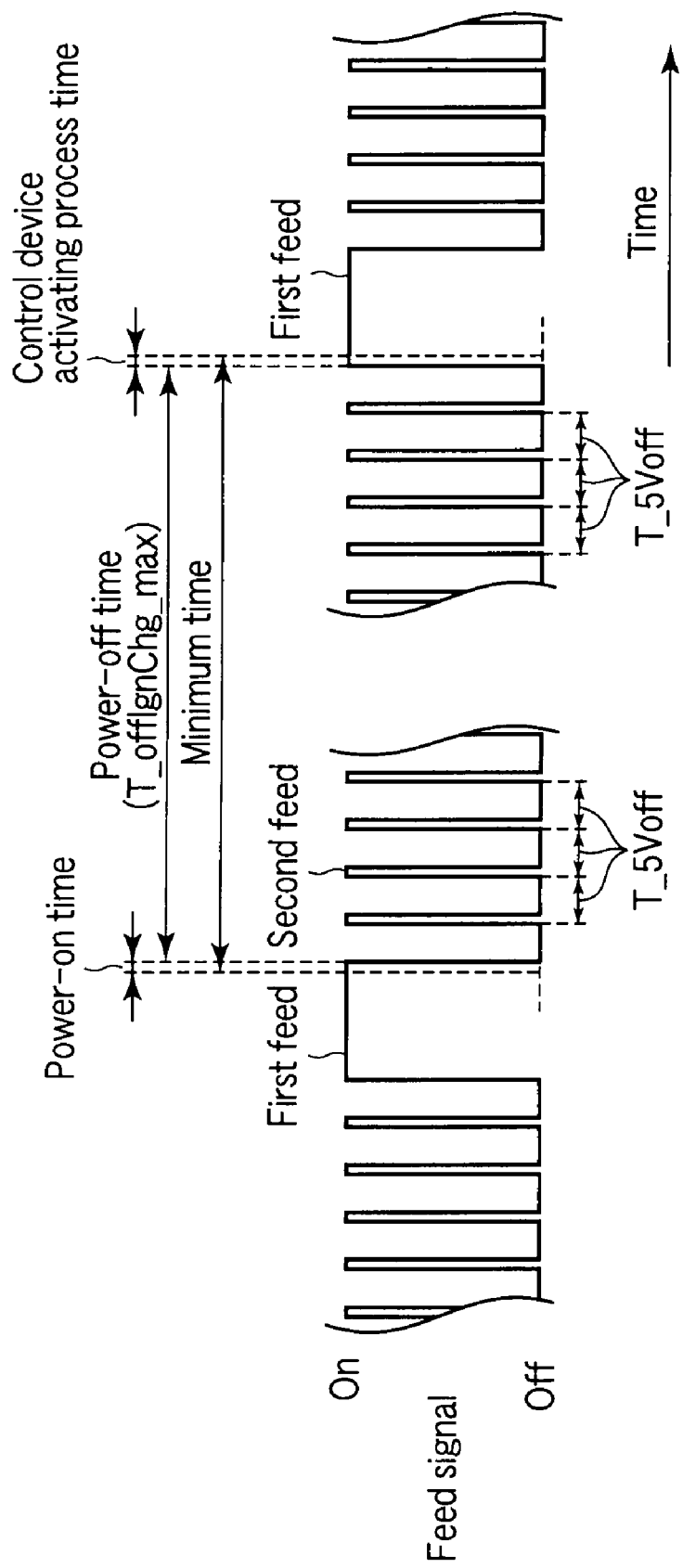
F I G. 11

SECONDARY BATTERY DEVICE AND VEHICLE

CROSS-REFERENCE TO RELATED APPLICATIONS

This application is based upon and claims the benefit of priority from Japanese Patent Applications No. 2009-200858, filed Aug. 31, 2009; No. 2009-228137, filed Sep. 30, 2009; and No. 2010-155139, filed Jul. 7, 2010; the entire contents of all of which are incorporated herein by reference.

FIELD

Embodiments described herein relate generally to a secondary battery device and a vehicle.

BACKGROUND

In a secondary battery device comprising an assembled battery including a plurality of secondary battery cells, the voltage of each secondary battery cell and the temperature of the assembled battery, for example, are monitored, so as to avoid dangerous states such as overvoltage.

Further, an assembled battery that uses a plurality of secondary battery cells in combination is generally known to cause unevenness in stored energy in the combined secondary battery cells due to variation in charge and discharge, temperature, and the like of the secondary battery cells.

When the energy stored in the secondary battery cells has become uneven, charge and discharge cannot be performed efficiently such that functions as an assembled battery are made best use of. Conventionally, a resistance discharge approach has been proposed, as a circuit that equalizes such energy.

The voltage correction circuit of the secondary battery, for example, judges unevenness in voltage or capacity of batteries and discharges by connecting a battery with a high energy to a resistance. The battery voltage correction device of the assembled battery, for example, performs a discharge operation so as to adjust the level before discharge. The conventional art proposes, for example, a battery group control device and a battery power system in which energy between unit cells is measured by an unloaded voltage, a remaining capacity of each of the unit cells is calculated, and a charge and discharge current is bypassed in a cell having a deviation greater than a set value with respect to a mean remaining capacity of the unit cells.

A secondary battery cell that equalizes energy (hereinafter referred to as "cell balance control") comprises, for example, an assembled battery including a plurality of secondary battery cells, an equalization circuit configured to discharge the secondary battery cells, a switch control circuit configured to control the operation of the equalization circuit, and a control device (such as micro processing unit (MPU)) configured to control the monitoring operation of the voltages of the secondary battery cells, the operation of the switching control circuit, and the like. The control device is fed from an external power source provided outside.

In order to discharge a secondary battery cell having a high stored energy and control the cell balance of a plurality of secondary battery cells forming an assembled battery, a relatively long time will be required. Further, when the assembled battery charges a plurality of secondary battery cells, the voltages of the secondary battery cells need to be monitored.

When a control device configured to control the monitoring operation of the voltages of a plurality of secondary battery cells, the operation of the switching control circuit, and the like, is constantly activated, it is difficult to suppress consumption of external power source.

When the above-described secondary battery device is installed in a vehicle, it is necessary to control the cell balance even while the vehicle is parked. Accordingly, if feed from a battery designed for electrical components to a control device is continued, for example, during the cell balance control, it is difficult to suppress consumption of the battery designed for electrical components.

Further, since the cell balance control is designed to equalize the energy stored in another secondary battery cell in a secondary battery cell with the minimum voltage by discharging the secondary battery cell, the secondary battery cell may be overdischarged if the cell balance control is continued. Such a case should be avoided.

As a method of avoiding overdischarge of a secondary battery cell and protecting the secondary battery cell, there is a method of forcedly stopping the cell balance control when an instruction to continue the cell balance control is not given to the cell balance execution device for a predetermined period of time.

When the cell balance execution device is configured so as to forcedly stop the cell balance control, it is necessary to give an instruction to continue the cell balance control from the control device to the cell balance execution device periodically, during the cell balance control. Accordingly, it is impossible to stop feeding to the control device even when a vehicle installed with a secondary battery device is parked. In such a case, too, it is desired to reduce power consumption of secondary battery cells is desired.

BRIEF DESCRIPTION OF THE DRAWINGS

FIG. 1 illustrates a configuration example of a secondary battery device and a vehicle comprising the secondary battery device according to an embodiment;

FIG. 2 illustrates a configuration example of an assembled battery module of the secondary battery device shown in FIG. 1;

FIG. 3 illustrates a configuration example of a unit configured to detect a temperature of the assembled battery module of the secondary battery device shown in FIG. 1;

FIG. 4 illustrates a configuration for performing a cell balance control in the secondary battery device shown in FIG. 1;

FIG. 5 illustrates a configuration example of a BMU of the secondary battery device shown in FIG. 1;

FIG. 8 illustrates a flowchart illustrating an operation example of a control circuit of a secondary battery device according to an embodiment;

FIG. 11 illustrates an example of a feed signal from the voltage supply management module to the control device during a cell balance control in a secondary battery device according to an embodiment.

DETAILED DESCRIPTION

Figure 6:
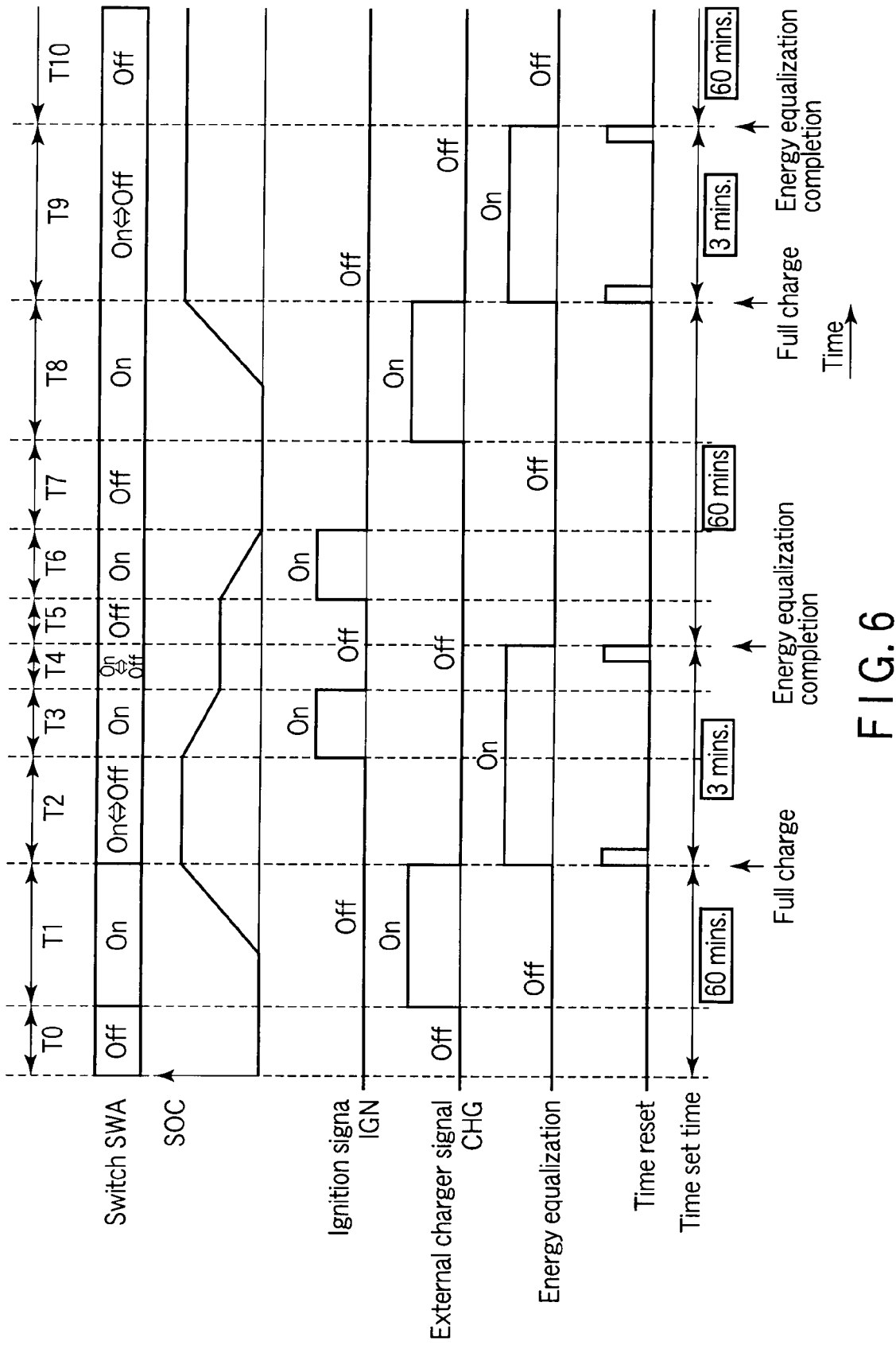
FIG. 6 illustrates an operation example of a voltage supply management module shown in FIG. 5.

In general, according to one embodiment, a secondary battery device comprises an assembled battery including a plurality of secondary battery cells, a power source supply management unit configured to receive supply of a power source supply voltage from an external power source and turn on and off the supply of the power source supply voltage, and a control circuit configured to receive feed from the power source supply management unit and control an operation of the assembled battery and the power source supply management unit, the power source supply management unit including a timer configured to output an ON signal every period of time set by the control circuit, an OR circuit configured to receive supply of an output signal from the timer, an external signal supplied from outside, and a switching control signal output from the control circuit, and a switch circuit configured to switch output of the power source voltage from the external power source according to an output signal from the OR circuit, the control circuit receiving supply of the output signal from the timer and the signal supplied from the outside, turning on the switching control signal after confirming which of the output signal from the timer or the external signal has turned on the switch circuit and turning off the switching control signal when both of the output signal from the timer and the external signal are turned off.

According to the present embodiment, it is possible to provide a secondary battery device capable of achieving lower power consumption and a vehicle comprising the secondary battery device.

Hereinafter, a second battery device and a vehicle comprising the second battery cell according to an embodiment of the present invention will be described with reference to the accompanying drawings.

FIG. 1 illustrates an example in which a battery device is installed in a vehicle 100 according to an embodiment. It is to be noted that FIG. 1 schematically shows the vehicle 100, the portion in which the secondary battery device is installed in the vehicle 100, and the driving motor of the vehicle 100.

The secondary battery device includes a plurality of assembled battery modules 101(1), 101(2), . . . 101 (4) connected in series. The assembled battery modules 101(1), 101 (2), . . . 101(4) can be independently detached, and replaced with another assembled battery module.

One terminal of a connection line 31 is connected to a negative electrode terminal of the assembled battery module 101(1) of a low-end side (the lower-voltage side will be referred to as a low end) of the secondary battery device. The connection line 31 is connected to a negative electrode input terminal of an inverter 40 via a current detecting portion included in a battery management device 60, which will be described later.

One terminal of a connection line 32 is connected to a positive electrode terminal of the assembled battery module 101(4) of a high-end side (the higher-voltage side will be referred to as a high end) of the secondary battery device via a switching device 33. The other terminal of the connection line 32 is connected to a positive electrode input terminal of the inverter 40. The switching device 33 includes a pre-charge switch SWP (shown in FIG. 5) which is turned on when the battery is charged and a main switch SWM (shown in FIG. 5) which is turned on when a battery output is supplied to a load.

The inverter 40 converts the input direct-current voltage to a three-phase alternating current (AC) high voltage used for driving a motor. The output voltage of the inverter 40 is controlled based on a control signal from a battery management unit (BMU) 60, which will be described later, or an electronic control device 71 configured to control the operation of the entire vehicle. The output terminals of the three phases of the inverter 40 are connected to the input terminals of the respective three phases of the motor 45.

An independent external power source 70 is connected to the battery management device 60. The external power source 70 is a lead-acid battery of the rating of 12V. Further, an electronic control device 71, which manages the entire vehicle in response to the operation input from an operator, for example, is also connected to the battery management device 60.

FIG. 2 illustrates functional blocks of voltage temperature monitoring (VTM) circuits 21-24 in detail. As shown in FIGS. 1 and 2, each of the assembled battery modules 101(1), 101(2) . . . 101(4) includes assembled batteries 11, 12, 13, 14 and assembled battery monitoring circuits 21, 22, 23, 24.

The assembled battery monitoring circuits 21, 22 are connected via communicating portions 211, 212, respectively, and can perform bidirectional communications. Similarly, the assembled battery monitoring circuits 23, 24 are connected via the communicating portions 211, 212, respectively, and can perform bidirectional communications.

The information input and output terminal on the low-end side of the assembled battery monitoring circuit 21 is connected to the battery management device 60 via a connector 51. The information input and output terminal of the higher end of the assembled battery monitoring circuit 21 is connected to the information input and output terminal on the low-end of the assembled battery monitoring circuit 22.

Further, the information input and output terminal on the low-end side of the assembled battery monitoring circuit 23 is connected to the battery management device 60 via the connector 52. The information input and output terminal on the high-end of the assembled battery monitoring circuit 23 is connected to the information input and output terminal on the lower end of the assembled battery monitoring circuit 24.

In the above-described example, the communicating portions 211, 212 of the assembled battery monitoring circuits 21, 22 have been described as being connected in series, and the communication paths of the assembled battery monitoring circuits 23, 24 have been described as being connected in series, but the communicating portion 211 of each of the assembled battery monitoring circuits 21-24 may be independently connected to the battery management device 60.

Since the functional blocks of the assembled battery monitoring circuits 21-24 have the same configuration, the functional block of the assembled battery monitoring circuit 21 will be described as a representative.

The assembled battery monitoring circuit 21 includes the communicating portion 211 on the low-end connected to the connector 51, and the communicating portion 212 on the high-end side connected to the assembled battery monitoring circuit 22. Further, the assembled battery monitoring circuit 21 includes a voltage detecting portion 213, and a temperature detecting portion 214. Further, the assembled battery monitoring circuit 21 includes an equalization processing portion 215 configured to equalize the voltages of the secondary battery cells, and a diagnosis circuit 216 configured to output a pulse signal based on a fundamental frequency of sequence control.

The voltage detecting portion 213 detects the voltages between terminals of the secondary battery cells of the assembled battery. The detected secondary battery cell voltages are transferred to the battery management device 60 via the communicating portion 211. The temperature detecting portion 214 detects the temperature of each of the secondary battery cells or the temperature in the vicinity of the secondary battery cells. The detected temperature data is transferred to the battery management device 60 via the communicating portion 21.

It is known that inconsistency in energy is caused between assembled secondary battery cells in a secondary battery device, due to variation in charge and discharge, temperature, and the like of the secondary battery. When the energy between secondary battery cells has become uneven, it is impossible to perform charge and discharge efficiently such that the functions as a secondary battery device are best used of. When the device is charged without being subjected to an equalization process in a state in which a secondary battery cell exists that has a high remaining capacity, the secondary battery cell with the high remaining amount may be in a full-charged state in a short time while the secondary battery cell with a low remaining capacity remains not being in a full-charged state, and the overall charging may be completed. Accordingly, it is necessary to cause the equalization processing module 215 to equalize the energy between the secondary battery cells.

Further, a sequencer or a control module is provided in each of the assembled battery monitoring circuits 21-24, and manages operation timing of data transmission and reception and switching.

FIG. 3 is a schematic configuration example of the assembled battery monitoring circuit 21. A plurality of secondary battery cells 11(1)-11(x) connected in series form an assembled battery 11. A positive electrode terminal and a negative electrode terminal of each of the secondary battery cells 11(1)-11(x) are connected to the voltage detecting portion 213.

The voltage detecting portion 213 individually measures the voltage between the positive electrode terminal and the negative electrode terminal of each of the secondary battery cells. Further, temperature sensors T(a)-T(x) are arranged in the vicinity of each of the secondary battery cells 11(1)-11(x). The output terminal of each of the temperature sensors T(a)-T(x) is connected to the temperature detecting portion 214. The temperature detecting portion 214 digitizes the output from the temperature sensors T(a)-T(x), and outputs the digitized output to the communicating portion 211.

FIG. 4 illustrates the equalization processing module 215. The negative electrode terminal and the positive electrode terminal of each of the secondary battery cells 11(1)-11(x) is connected to the voltage detecting portion 213 via the discharge resistances 21r(1)-21r(x+1), respectively.

One of the terminals of the discharge resistance 21r(1) and the discharge resistance 21r(2) is connected to the negative electrode terminal and the positive electrode terminal of the secondary battery cell 11(1), and the other terminal is connected via a discharge switch SW(1).

One of the terminals of the discharge resistance 21r(2) and the discharge resistance 21r(3) is connected to the negative electrode terminal and the positive electrode terminal of the secondary battery cell 11(2), and the other terminal is connected via a discharge switch SW(2). Similarly, two pairs of discharge resistances are connected to the negative electrode terminal and positive electrode terminal of the corresponding secondary battery cell, and the other terminal is connected via a corresponding discharge switch.

The discharge resistances 21r(1)-21r(x+1) and the discharge switches SW(1)-SW(x+1) are included in the equalization circuit 21A. The discharge switches SW(1)-SW(x+1) are controlled to be turned on or off.

The voltage detection portion 213 detects the voltages between the terminals of the secondary battery cells 11(1)-11(x). The detected secondary battery cell voltages are fetched into an energy deviation calculation portion 601 of the battery management device 60 via the communicating portions. Further, the current flowing through the assembled battery 11 is detected by the current detecting circuit 602, and fetched into the energy deviation calculation portion 601.

In order to detect the energy deviation between the secondary battery cells, i.e., the unevenness in secondary battery cell voltage, a voltage is supplied to between the positive electrode and the negative electrode of the assembled battery 11. When there is an energy variation between the secondary battery cells, a difference will be caused in time required for the voltages of the secondary battery cells to reach a predetermined specific voltage.

Now, for simplicity's sake, assume that there are three secondary battery cells AX, BX, CX connected in series, and a time difference has occurred between the secondary battery cells AX, BX, CX in time required to reach the specific time. Further, assume that the secondary battery cell AX has reached the specific voltage earliest, and the time required at that time is 0 second, which is the reference time t0.

Assume that the time required for the second battery cells BX, CX to reach the specific voltage with respect to the reference time t0 are reached times t1, t2, respectively. The capacity difference (mAh) between the secondary battery cell AX and the secondary battery cell BX, the capacity difference (mAh) between the secondary battery cell AX and the secondary battery cell CX are calculated from the reached times t1, t2 and the value of the current flowing through the assembled battery 11.

Further, it is calculated how long the secondary battery cells BX, CX need to be discharged such that the secondary battery cells BX, CX have the same remaining amount (state of charge: SOC), based on the calculated capacity difference. This calculation is performed by a discharge time converting portion 603, and discharge time data of each of the secondary battery cells is obtained.

The discharge time data of each of the secondary battery cells is input to the switch control circuit 21B in the equalization processing portion 215. The switch control circuit 21B comprises an inner timer, not shown, and controls the discharge switches SW(1)-SW(x+1) in the equalization circuit 21A to turn on or off. Here, the discharge switch corresponding to the secondary battery cell in a position to be discharged is turned on, and the secondary battery cell is discharged, i.e., the energy of the secondary battery cell is emitted. Thereby, energy equalization is performed between a secondary battery cell with a high energy and a secondary battery cell with a low energy.

FIG. 5 illustrates an overall block of the battery management device 60. As shown in FIG. 5, the battery management device 60 comprises a current detection circuit 602, an interface circuit 604 connected to the communicating portions 211 of the assembled battery monitoring circuits 21, 23 via the connectors 51, 52, an alert signal processor 605, to which a pulse signal output from the diagnosis circuit 216 of the assembled battery monitoring circuits 21-24 is supplied and which outputs an alert signal, a power source supply management unit 606, to which a power source supply voltage is supplied from the external power source 70, a contactor driving circuit 608, a memory 607, and a control circuit (MPU) CTR configured to control the operation of the secondary battery device.

The memory 607 is an Electronically Erasable and Programmable Read-Only Memory (EEPROM), for example. A program defining the operation of the control circuit CTR is recorded in the memory 607. The energy deviation calculating portion 601 and the discharge time converting portion 603 shown in FIG. 4 are included in the control circuit CTR.

A power source supply voltage, an ignition signal IGN, and an external charger signal CHG are supplied from the external power source 70, an ignition (not shown), and an external charger (not shown) via a connector CN1. Further, the battery management device 60 transmits and receives signals to and from the electronic control device 71 via a connector CN2.

The voltage value of the secondary battery cell, data such as the temperature value of the assembled battery, the pulse signal output from the diagnosis circuit 216, and a communication-purpose power source signal are supplied to the interface circuit 604 from the connectors 51, 52. It is to be noted that insulated communications are performed between the assembled battery monitoring circuits 21, 23 and the battery management device 60, because of difference in ground potential.

The interface circuit 604 supplies data on the voltage value of the secondary battery cell, the temperature value of the assembled battery, and the like to the control circuit CTR via $I^2C$ (Inter-Integrated Circuit) communications, and supplies a pulse signal output from the diagnosis circuit 216 to the alert signal processor 605. A clock signal, a data signal, and a shutdown signal (SHDN) are supplied to the assembled battery monitoring circuits 21, 22 from the interface circuit 604.

The alert signal processor 605 judges whether the pulse signal supplied from the interface circuit 604 is normal or abnormal. When the pulse signal is normal, the alert signal processor 605 outputs an alert signal configured to turn on and off at a certain frequency. When the pulse signal is abnormal, the alert signal processor 605 outputs an alert signal of a certain value. The alert signal output from the alert signal processor 605 is supplied to the control circuit CTR and the contactor driving circuit 608.

The contactor driving circuit 608 outputs a signal S1 for controlling the operation of the pre-charge switch SWP of the switching device 33, and a signal S2 for controlling the operation of the main switch SWM.

The signals S1, S2 are supplied to the switching device 33 via the connector CN1. The pre-charge switch SWP and the main switch SWM are turned on or off by the signals S1, S2 supplied to a contactor provided in the vicinity.

For example, when the pulse signal is abnormal, the control circuit CTR judges that the corresponding assembled battery monitoring circuit is abnormal from the supplied alert signal, and controls the contactor driving circuit 608 to turn off the pre-charge switch SWP and the main switch SWM.

The power source supply management unit 606 supplies a power source voltage to the power detection circuit 602, the interface circuit 604, the alert signal processor 605, the memory 607, and the control circuit CTR.

The power source supply management portion 606 comprises a switching circuit 606S configured to turn on or off the power source voltage supply to the control circuit CTR, and a timer TM. The power source voltage of 12V output from the external power source 70 is converted into a direct-current voltage of 5V by the DC/DC circuit C1 arranged in the former stage of the timer TM, and then supplied to the timer TM.

The switching circuit 606S comprises an OR circuit C3, to which a wake-up signal from the timer TM, an ignition signal IGN, an external charger signal CHG, and a switching control signal from the control circuit CTR are supplied, and a switch circuit SWA, to which a power source voltage from the external power source 70 is supplied, and which outputs or stops a power source voltage supplied from the external power source 70 according to the signal output from the OR circuit C3.

It is to be noted that the wake-up signal from the timer TM is a signal that is turned ON (=1) at every set time. The timing at which the wake-up signal is set on is set by the control circuit CTR. In the present embodiment, in the period of time during which the cell balance control is performed, the timer TM is set to 3 minutes, and in the period of time during which the cell balance is not performed, the timer TM is set to 60 minutes, for example.

The ignition signal IGN is a signal that is turned on (equal to or greater than a preset voltage) when a key is inserted into an ignition, and is turned off (less than a preset voltage) when the key is removed. The external charger signal CHG is a signal that is turned on (equal to or greater than a predetermined voltage) when the external charger is connected to the secondary battery device, and is turned off (less than a predetermined voltage) when the external charger is disconnected. The wake-up signal, the ignition signal IGN, and the external charger signal CHG are also supplied to the control circuit CTR.

When the secondary battery device is installed in a device other than a vehicle, the ignition signal is turned on when a power on operation is performed on the device installed with a secondary battery device, and is turned off when the power off operation is performed.

When at least one of the ignition signal IGN, the external charger signal CHG, and the wake-up signal is turned on, a signal for turning on the switch circuit SWA is output from the OR circuit C3. When the switch circuit SWA is turned on, the power source voltage supplied from the external power source 70 is supplied to the DC/DC circuit C2 via the switching circuit SWA, converted into a direct current voltage of 5V by the DC/DC circuit C2, and then supplied to the alert signal processor 605 and the control circuit CTR.

Further, when at least one of the ignition signal IGN, the external charger signal CHG, and the wake-up signal is turned on, the switching circuit 606S converts the power source voltage supplied from the external power source 70 to a direct current voltage of a predetermined size by the inner DC/DC circuit C5, and supplies it to the interface circuit 604 and the current detection circuit 602.

Here, when one of the ignition signal IGN, the external charger signal CHG, and the wake-up signal is turned on and a signal for turning on the switch circuit SWA is output from the OR circuit C3, the control circuit CTR confirms which signal has turned on the switching circuit SWA.

A wake-up signal is supplied by the timer TM to the control circuit CTR, and an ignition signal IGN and an external charger signal CHG are supplied to the control circuit CTR via the connector CN1. Accordingly, the control circuit CTR can confirm which signal has turned on the switching circuit SWA. After confirming which signal has turned on the switching circuit SWA, the control circuit CTR turns on the switching control signal and maintains the state in which the power source voltage is supplied.

The control circuit CTR monitors the wake-up signal, the ignition signal IGN, and the external charger signal CHG, and when all the signals are turned off, the control circuit CTR turns off the switching control signal and turns off the switch circuit SWA.

FIG. 6 illustrates the operation timing of the switching circuit SWA corresponding to the signal supplied to the switching circuit 606S and the cell balance control operation. In a period of time T0, the ignition signal IGN and the external charger signal CHG are turned off. In the period of time T0, since the cell balance control is not performed, the timer TM is set to 60 minutes. Accordingly, the switching circuit SWA is turned off in the period other than the period in which the wake-up signal output from the timer TM is turned on every 60 minutes.

In a period of time T1, the ignition signal IGN is turned off and the external charger signal CHG is turned on. Accordingly, a signal output from the OR circuit C3 turns on the switching circuit SWA, and a power source voltage of 5V is supplied to the control circuit CTR via the DC/DC circuit C2.

The control circuit CTR confirms that the external charger signal CHG has been turned on and thereby the power source voltage has been supplied based on the supplied ignition signal IGN, the external charger signal CHG, and the wake-up signal, turns on the switching control signal, and maintains supply of the power source voltage.

In the period T2, the ignition signal IGN and the external charger signal CHG are turned off. Further, in this period, cell balance control is performed. Accordingly, the control circuit CTR sets the timer TM to 3 minutes, for example, from 60 minutes, and turns off the switching control signal so as to stop supplying the power source voltage. As a result, in the period T2, since the wake-up signal output from the timer TM is turned on, the power source voltage is supplied to the control circuit CTR every three minutes. The control circuit CTR turns on and off the switching control signal every three minutes.

FIG. 8 is a flowchart illustrating the operation of the control circuit CTR in the period T2, when the ignition signal IGN and the external charger signal CHG are turned off. Detecting that the ignition signal IGN and the external charger signal CHG have been turned off (step ST1), the control circuit CTR acquires the voltage value between the positive electrode and the negative electrode, the temperature value and error detection data of each of the secondary battery cells 11(1)-14(X) from the interface circuit 604, calculates the time (hereinafter referred to as "cell balance time") required to perform cell balance control based on the voltage between the positive electrode and the negative electrode of each of the secondary battery cells 11(1)-14(X) (step ST2).

Figure 9:
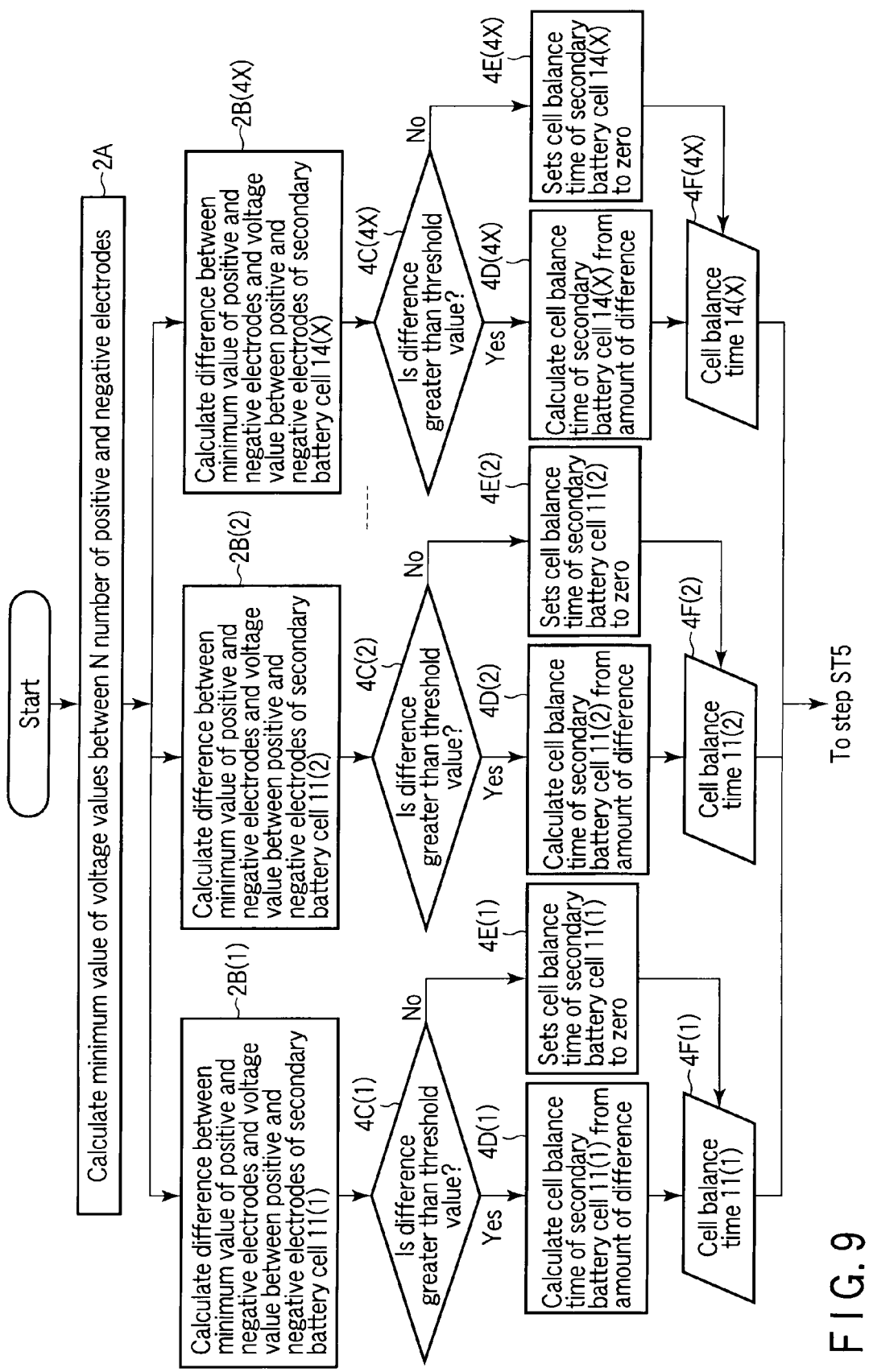
FIG. 9 illustrates a flowchart illustrating an example of an operation of a control circuit of a secondary battery device of calculating a cell balance time according to an embodiment.

FIG. 9 illustrates an example of operation of calculating the cell balance time. First, the control circuit CTR calculates the minimum value in the 4x number of positive/negative electrode voltage values between positive and negative electrodes (step 2A). Next, the control circuit CTR calculates the cell balance time of each of the secondary battery cells 11(1)-11(X) in parallel.

For example, in order to calculate the cell balance time of the secondary battery cell 11(1), the control device CTR calculates difference between the minimum value of x number of voltage values between the positive electrodes and the negative electrodes and the voltage value between the positive electrode and the negative electrode of the secondary battery cell 11(1) (step 2B(1)), and judges whether the calculated difference is greater than a threshold value (step 2C (1).

When the calculated difference is greater than the threshold value, the control circuit CTR calculates a cell balance time of the secondary battery cell 11(1) based on the size of the calculated difference (step 2D (1). When the calculated difference is equal to or lower than a threshold value, the control circuit CTR sets the cell balance time of the secondary battery cell 11(1) to zero (step 2E (1)). The control circuit CTR calculates the cell balance time of each of the secondary battery cells 11(2)-14(X) in the same way as the secondary battery cell 11(1). The threshold value is the minimum value of the differential values of the secondary battery cells 11(1)-14(X), from which it is judged that the energy stored in the secondary battery cell should be discharged.

Next, the control circuit CTR sets the initial value of the counting variable T_offIgnChg to zero (0) (step ST3). After that, the control circuit CTR judges whether the cell balance control is performed or continued or not (step ST4).

When the cell balance control is performed (step ST5), the control circuit CTR causes the switch control circuit of each of the assembled battery monitoring circuits 21-24 to perform cell balance based on the calculated cell balance time. The control circuit CTR supplies the calculated power-on time and the power-off time (6E shown in FIG. 9) to the timer TM of the switching circuit 606S, and sets the power-on time and the power-off time.

That is, the control circuit CTR supplies a switch-on instruction signal and a switch-off instruction signal to the switch control circuits 21B-24B based on the calculated cell balance time, and causes the switch control circuits 21B-24B to start cell balance control. The switch-on instruction signal and the switch-off instruction signal are signals used to instruct each of the switching elements SW(1)-SW(x−1) to be closed or opened based on the calculated cell balance time.

Next, the control circuit CTR calculates a power-on time and a power-off time (T_offIgnChg_max) based on the calculated cell balance time (2F(11(1)-2F(14(x)) shown in FIG. 8). It is to be noted that the time required to perform communications between the control circuit CTR and the switching circuit 606S will not considered in the operation of calculating the power-on time and the power-off time, which will be described below.

Figure 10:
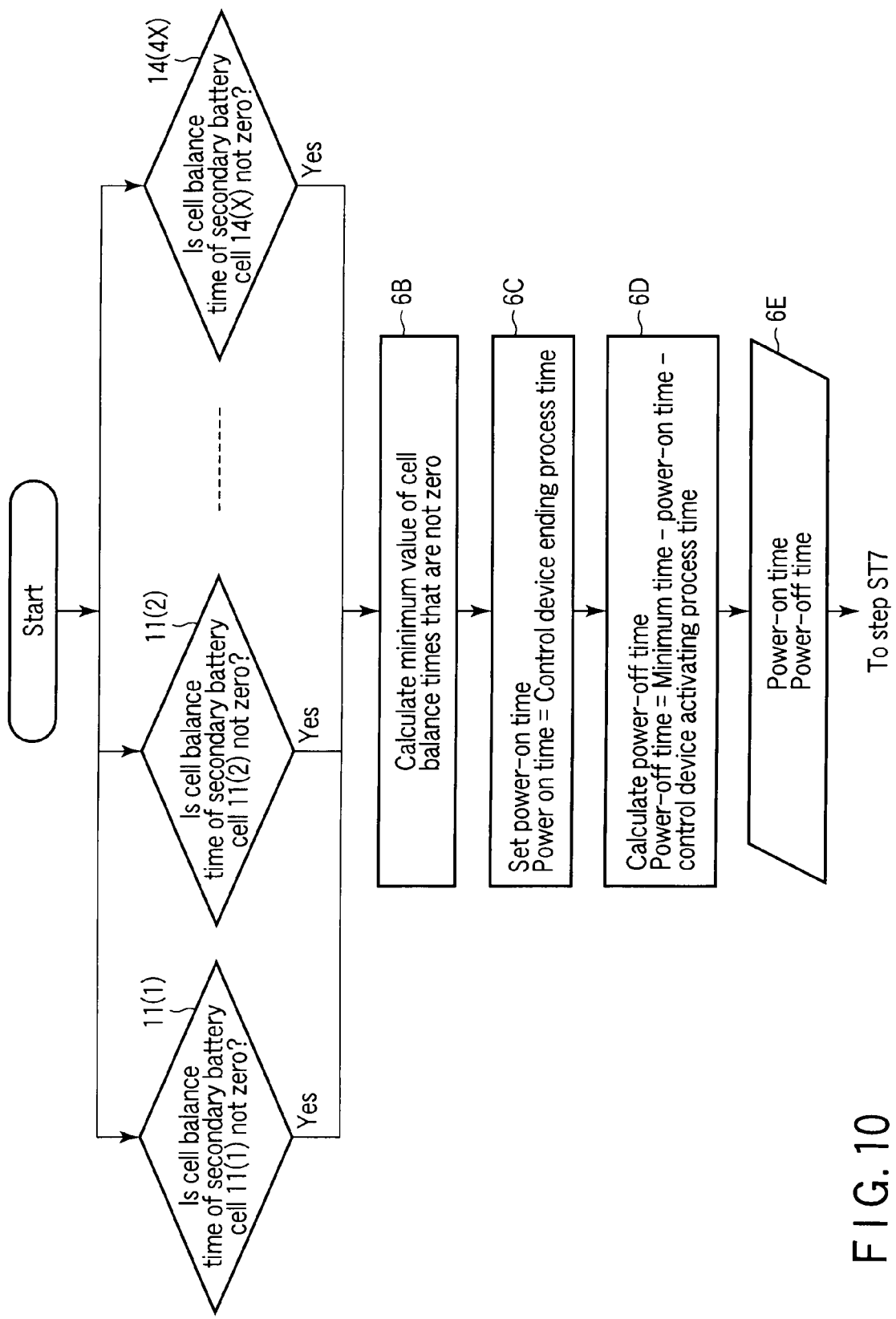
FIG. 10 illustrates an exemplary operation of a control circuit of a secondary battery device of calculating a power-on time and a power-off time according to an embodiment.

FIG. 10 shows an example of operation of calculating the power-on time and the power-off time. First, the control circuit CTR judges whether the cell balance time of each of the secondary battery cells 11(1)-14(X) is zero or not (steps 6A(1)-6A (4X), and calculates the minimum value of the cell balance times judged as not being zero (step 6B).

The control circuit CTR sets the power-on time as the time (control device ending process time) required for an ending process of the control device (step 6C). Next, the control circuit CTR sets the time obtained by subtracting the power-on time and the time required for an activating process of the control device (control device activation process time) from the minimum value (minimum time) of the cell balance times judged as not being zero in steps 6A(1)-6A(4A) as the power-off time (step 6D).

Next, the control circuit CTR sets the cycle time (T__5Voff) set by the timer TM in the period while the cell balance control is performed to three minutes, for example (step ST6), increments three (minutes) to the counting variable T_offIgnChg (step ST7), and sets T__5Voff in the timer TM (step ST8). After that, the control circuit CTR controls the timer TM to turn off the wake-up signal, causes the switching control signal to turn off the switch circuit SWA of the switching circuit 606S, and thereby the power source to the control circuit CTR is turned off (step ST9).

When the ignition signal IGN or the external charger signal CHG is turned on while the power source supply to the control circuit CTR is turned off (step ST10), the ignition signal IGN or the external charger signal CHG turn on the switching circuit SWA, and the power source voltage is supplied to the control circuit CTR. After confirming that the ignition signal IGN or the external charger signal CHG is turned on, the control circuit CTR turns on the switching control signal and maintains the power source supply.

When the ignition signal IGN or the external charger signal CHG are maintained to be turned off and the cycle time T__5Voff has elapsed after the wake-up signal is turned off (step ST11), the timer TM turns on the wake-up signal and turns off the switch circuit SWA. When the switch circuit SWA is turned on, the power source voltage is supplied to the control circuit CTR. After confirming that the wake-up signal has been turned on, the control circuit CTR turns on the switching control signal and maintains the power source supply.

After that, the control circuit CTR judges whether the counting variable T_offIgnChg is 60 (minutes), for example (step ST13). Here, the control circuit CTR may be configured to judge whether the counting variable T_offIgnChg is equal to or greater than the minimum value (T_offIgnChgmax) of the cell balance times, for example.

When the counting variable T_offIgnChg is not 60 (minutes), the control circuit CTR judges whether to continue the cell balance control or not (step ST4), and maintains the cell balance control if a secondary battery cell exists in which the remaining time of the cell balance time is not zero at that point in time.

If the cell balance times of all the secondary battery cells are zero, the control circuit CTR judges that the cell balance control will not be continued. In this case, the control circuit CTR sets the cycle time T__5Voff to power-off time T_offIgnChg_max (60 minutes, for example)—counting variable T_offIgnChg (step ST14), and sets the counting variable T_offIgnChg to the power-off time T_offIgnChg_max (60 minutes, for example) (step ST15). When the cycle time T__5Voff is set as above (step ST9), if the ignition signal IGN or the external charger signal CHG are not turned on (step ST10) after the power source of the control circuit CTR is turned off, the power source of the control circuit CTR is not turned on until the time obtained by subtracting the counting variable T_offIgnChg from the power-off time T_offIgnChg_max elapses, and the power consumption can be suppressed.

If the counting variable T_offIgnChg is 60 (minutes) in step ST13, the control circuit CTR judges that the current feed is the first feed, acquires error detection data, such as the voltage value between the positive and negative electrodes and the temperature value of the secondary battery cells acquired from the assembled battery monitoring circuits 21-24 (step ST16), and performs cell state estimation, error diagnosis, and the like (step ST17). After that, the control circuit CTR sets the counting variable T_offIgnChg to zero again (step ST3), and judges whether to continue the cell balance control or not (step ST4).

FIG. 11 illustrates an example of a feed signal from the switching circuit 606S to the control circuit CTR. When the wake-up signal is controlled to be turned off after the control circuit CTR has set the power-on time, the power-off time, and the cycle time T__5Voff, the timer TM turns on the wake-up signal such that the first feed is performed to the control circuit CTR until the power-on time elapses.

The control circuit CTR performs an end process in the power-on time. After the power-on time has elapsed, the timer TM turns off the wake-up signal, stops the first feed to the control circuit CTR from the switching circuit 606S, and thereby the power of the control circuit CTR is turned off.

After that, when the ignition signal IGN or the external charger signal CHG are turned on, the switching circuit SWA of the switching circuit 606S is turned on, and the power is supplied to the control circuit CTR. When the cycle time T_5Voff has elapsed without the ignition signal IGN or the external charger signal CHG being turned on, the timer TM turns on the wake-up signal, and the second feed is performed to the control circuit CTR.

Here, each of the switching circuits 21B-24B comprises an inner timer (not shown) and is configured to forcedly stop the cell balance control if the instruction signal to continue the cell balance control is not given from the control circuit CTR while the inner time counts a predetermined period of time.

Thereby, when the control circuit CTR is broken, it is possible to avoid overdischarge of the secondary battery cells 11(1)-14(X) by causing the switch control circuit 21B to continue the cell balance control. This assures safety of the secondary battery device.

When the control circuit CTR causes the switch control circuit CTR to continue the cell balance control even in the power-off time (T_offIgnChg_max) (step ST4), the second feed is performed to the control circuit CTR every cycle time T__5Voff set in the timer TM. While the second feed is performed, the control circuit CTR accesses the switch control circuit 21B and supplies an instruction signal to continue the cell balance control (step ST5). The instruction signal to continue the cell balance control is, for example, a signal for turning on or off the switching elements SW(1)-SW(x−1), as well as the switch-on instruction signal and the switch-off instruction signal output immediately before that.

After the power-off time (T_offIgnChg_max) has elapsed, the timer TM turns on the wake-up signal and the first feed to the control circuit CTR is started, and the control circuit CTR is powered on. After that, the control circuit CTR performs an activating process. At the point in time when the activating process of the control circuit CTR has ended, the control circuit CTR supplies a switch-on instruction signal and a switch-off instruction signal to the switch control circuits 21B-24B, and ends discharge of a secondary battery cell that is included in the secondary battery cells 11(1)-14(X) and has the minimum cell balance time.

Here, the control circuit CTR judges whether the feed from the timer TM is the first feed or the second feed, based on the information (such as the value of the counting variable T_offIgnChg) stored in the memory 607 of the control circuit CTR. That is, the control circuit CTR judges whether the current feed is the first feed or the second feed based on the information stored in the memory 607 after the first feed or the second feed is started and the activating process has ended.

Next, the control circuit CTR judges whether the elapsed time after the voltage value between the positive and negative electrodes of the secondary battery cells 11(1)-14(X) is acquired last time is equal to or greater than 1 hour (step ST11), and, when the elapsed time is equal to or greater than 1 hour, returns to step ST2 to acquire the current voltage value between the positive and negative electrodes of the secondary battery cells 11(1)-14(X).

While it has been described in step ST13 that is it is judged whether the elapsed time is equal to or greater than 60 minutes, the time used as a reference for elapsed time is not limited to 60 minutes. The time used as the reference for elapsed time may be variable according to the temperature or the period used, and should desirably be set to an appropriate time compliant with properties of the secondary battery cell. The time used as the reference for elapsed time is set such that safety is assured in using the secondary battery device, according to the timing and cycle at which the cell state estimation and error diagnosis of the secondary battery cells 11(1)-14(X) should be performed.

The operation of performing a state estimation of the secondary battery cells 11(1-14(X) and error diagnosis of components, wiring, and the like is an exemplary operation in the period while the ignition signal IGN and the external charger signal CHG are turned off, and another operation may be further included, or such operations may be omitted.

The control circuit CTR reads the cell balance time of the secondary battery cells BT stored in the memory 607, for example, when the control circuit CTR judges whether to continue the cell balance control in step ST4, and judges whether to continue the cell balance control or not. When the cell balance control is performed, the control circuit CTR may be configured to calculate the power-on time and the power-off time based on the cell balance time of the secondary battery cells BT stored in the memory 607. In this case, the minimum value of the cell balance times is calculated from the cell balance times of the secondary battery cells other than the secondary battery cell in which discharge by the cell balance control has ended.

The power-off time takes a value obtained by subtracting the power-on time and the control device activating process time from the minimum value of the cell balance times. In order to continue the cell balance, however, the power-off time takes a value obtained by calculating the cell balance time, and then further subtracting the time required to update setting of the timer TM this time since the power-on time and the power-off time are set for the first time.

When the secondary battery device is controlled as above while a vehicle is parked, it is possible to avoid overdischarge of the secondary battery cells 11(1)-14(X) and protect the secondary battery cells 11(1)-14(X) by performing the cell balance control. Further, it is possible to reduce power consumption of the secondary battery device, since there will be no necessity to constantly feed the control device 308 from the battery 700 for electrical components.

Compared to the case where the control device 308 is constantly fed while a vehicle is parked, the secondary battery device and the vehicle according to the present embodiment have achieved reducing 70% of the discharge capacity of the battery 700 for electrical components while a vehicle is parked.

By thus setting the timer TM, the timing at which the control circuit CTR is fed is varied, between the period when the cell balance control is performed and the period when the cell balance control is not performed.

In the period T3, the ignition signal IGN is turned on and the external charger signal CHG is turned off. In the period T3, the cell balance control is continued. In this case, since the ignition signal IGN is turned on, the switching circuit SWA is turned on by the signal output from the OR circuit C3, and the power source supply voltage of 5V is supplied to the control circuit CTR via the DC/DC circuit C2.

The control circuit CTR confirms that the external charger signal CHG being turned on and thereby the power source supply voltage has been supplied, based on the supplied ignition signal IGN, the external charger signal CHG, and the wake-up signal, turns on the switching control signal, and maintains supply of the power voltage.

Figure 12:
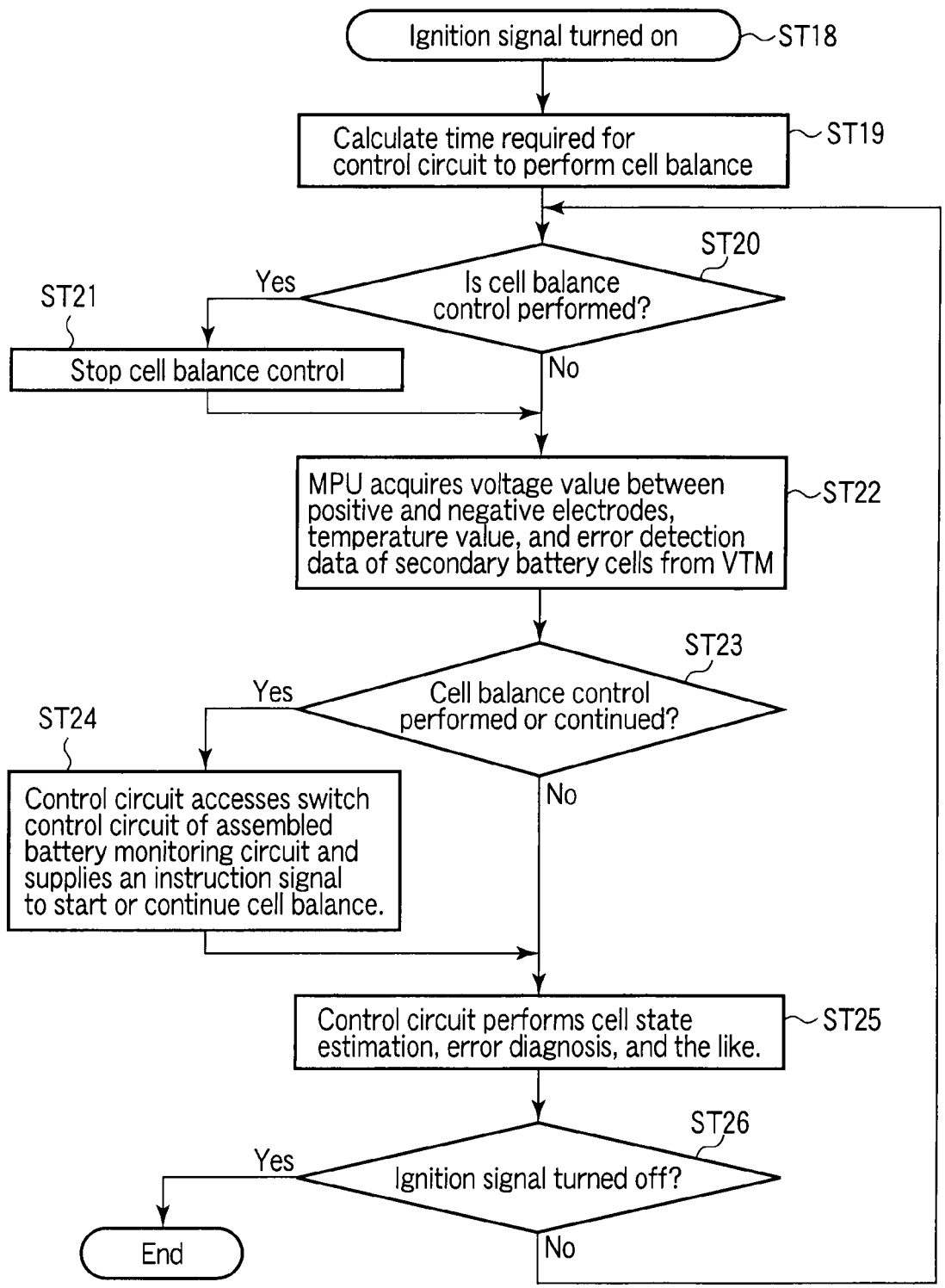
FIG. 12 is a flowchart illustrating another example of an operation of a control circuit of a secondary battery device according to an embodiment.

FIG. 12 is a flowchart illustrating an example of operation of the control circuit CTR when the ignition signal IGN is turned on.

Detecting that the ignition signal IGN is turned on (step ST18), the control circuit CTR calculates the time required to perform cell balance control (step ST19). The time required to perform the cell balance control is calculated in the same way as the steps 2A-2F.

After that, the control circuit CTR judges whether the cell balance control is performed or not (step ST20). When the cell balance control is performed, an instruction signal to stop the cell balance control is supplied to the switch control circuits 21B-24B (step ST21).

Next, the control circuit CTR acquires error detection data such as the voltage value between the positive and negative electrodes, the temperature value, and the like of the secondary battery cells 11(1)-14(x), based on the assembled battery monitoring circuits 21-24 (step ST22).

After that, the control circuit CTR judges whether to perform or continue the cell balance control or not (step ST23), and, when the cell balance control is performed or continued, accesses the switch control circuits 21B-24B of the assembled battery monitoring circuits 21-24 and supplies an instruction signal to start or continue the cell balance (step ST24). In this case, the control circuit CTR accesses the switch control circuits 21B-24B every predetermined cycle time and supplies an instruction signal, so as to cause the switch control circuits 21B-24B to continue the cell balance control.

After that, the control circuit CTR performs cell state estimation and error diagnosis, for example, based on the acquired error detection data (step ST25). The control circuit CTR performs cell state estimation and error diagnosis, for example, per every cycle time longer than the cycle time at which the instruction signal to continue the cell balance control is supplied to the switch control circuits 21B-24B.

The control circuit CTR repeats the operation of the steps ST20-ST25 until the ignition signal IGN is turned off (step ST26). When the ignition signal IGN is turned off (step ST26), the control circuit CTR ends the operation.

In the period T4, the ignition signal IGN and the external charger signal CHG are turned off, and the cell balance control is continued. Accordingly, in the period T4, as in the case of the period T2, a wake-up signal output from the timer TM is turned on, and thereby the power source supply voltage is supplied to the control circuit CTR every three minutes. Accordingly, the control circuit CTR turns on and off the switching control signal every three minutes. Further, the control circuit CTR resets the time set in the timer TM as the timing at which the cell balance control is to be ended from 3 minutes to 60 minutes.

In the period T5, the ignition signal IGN and the external charger signal CHG are turned off, and the cell balance control is not performed, either. Accordingly, the switch circuit SWA is turned off during the period other than the period in which the wake-up signal output from the timer TM is turned on every 60 minutes.

In the period T6, the ignition signal IGN is turned on and the external charger signal CHG is turned off. The cell balance control is not performed. Accordingly, since the ignition signal IGN is turned on, the switching circuit SWA is turned on by the signal output from the OR circuit C3, and the power source supply voltage of 5V is supplied to the control circuit CTR via the DC/DC circuit C2.

The control circuit CTR confirms that the ignition signal IGN has been turned on and thereby the power source supply voltage has been supplied, based on the supplied ignition signal IGN, the external charger signal CHG, and the wake-up signal, turns on the switching control signal, and maintains supply of the power source supply voltage.

In the period T7, the ignition signal IGN and the external charger signal CHG are turned off, and the cell balance control is not performed either. Accordingly, the control circuit CTR confirms that the ignition signal IGN has been turned off, and turns off the switching control signal and stops supply of the power source supply voltage.

In the period T8, the ignition signal IGN is turned off and the external charger signal CHG is turned on. The cell balance control is not performed. Accordingly, since the external charger signal CHG is turned on, the switch circuit SWA is turned on by the signal output from the OR circuit C3, and the power source supply voltage of 5V is supplied to the control circuit CTR via the DC/DC circuit C2.

The control circuit CTR confirms that the external charger signal CHG is turned on and thereby the power source supply voltage is supplied based on the supplied ignition signal IGN, the external charger signal CHG, and the wake-up signal, turns on the switching control signal, and maintains supply of the power source supply voltage.

In the period T9, the ignition signal IGN and the external charger signal CHG are turned off, and the cell balance control is performed. Accordingly, the control circuit CTR resets the timer TM from 60 minutes to 3 minutes, as in the case of the period T2, and turns off the switching control signal and stops supply of the power source supply voltage. As a result of that, in the period T9, the wake-up signal output from the timer TM is turned on, and the power source supply voltage is supplied to the control circuit CTR every three minutes. Accordingly, the control circuit CTR turns on and off the switching control signal every three minutes. Further, the control circuit CTR resets the time set in the timer TM as the timing at which the cell balance control is to be ended from 3 minutes to 60 minutes.

In the period T10, the ignition signal IGN and the external charger signal CHG are turned off, and the cell balance control is not performed either. Accordingly, the switching circuit SWA is turned off in the period other than the period in which the wake-up signal output from the timer TM is turned on every 60 minutes.

Thus, by configuring such that supply of the power source supply voltage to the control circuit CTR is performed only when at least one of the ignition signal IGN, the external charger signal CHG, and the wake-up signal is turned on, the power consumption of the control circuit CTR can be reduced.

Accordingly, according to the secondary battery device and a vehicle comprising the secondary battery device according to the present embodiment, it is possible to provide a secondary battery device capable of achieving low power consumption and a vehicle comprising the secondary battery device.

Figure 7:
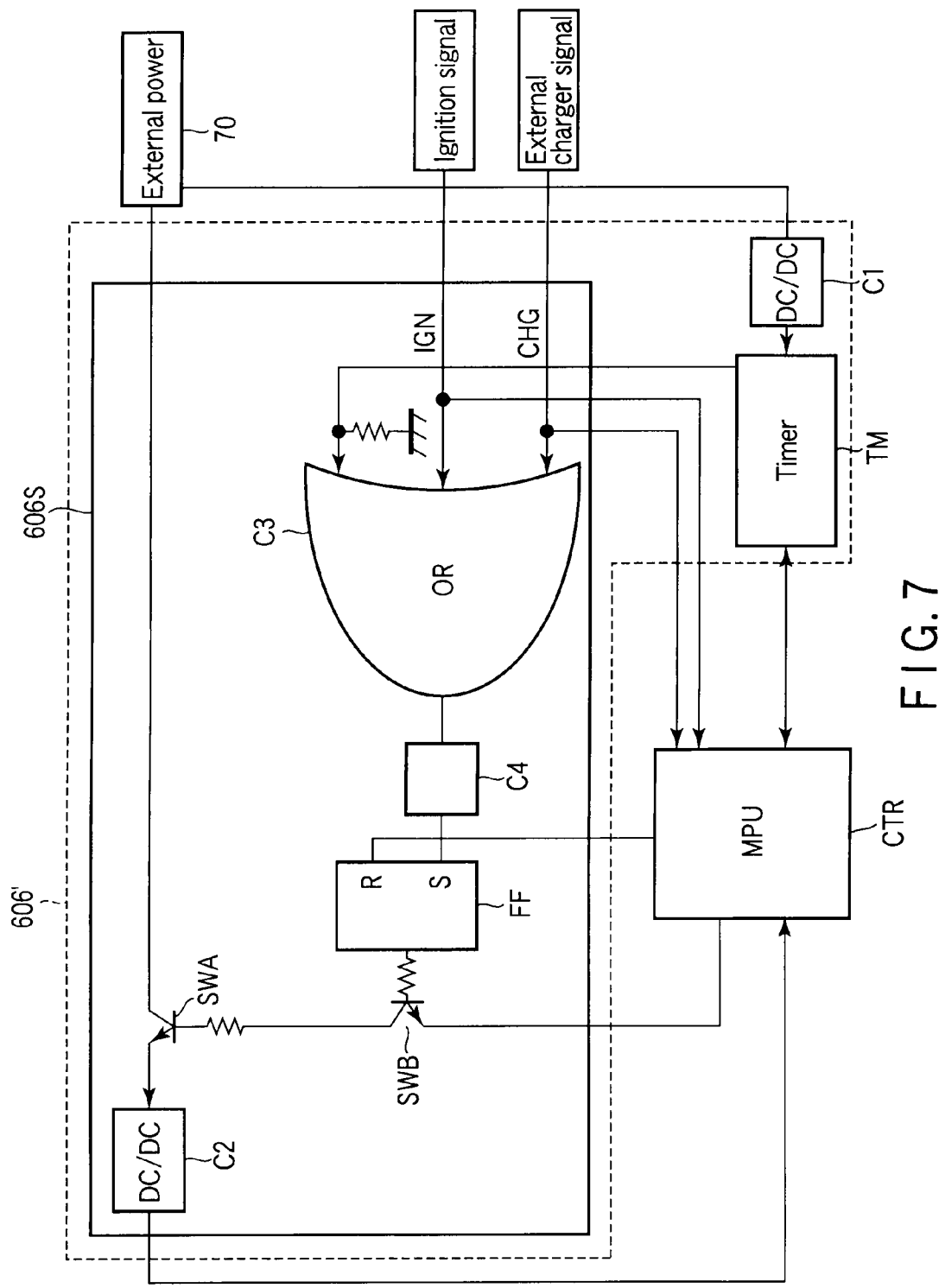
FIG. 7 illustrates another configuration example of a voltage supply management module.

FIG. 7 illustrates another configuration example of the power source supply management unit. In the illustration of the power source supply management unit 606 in FIG. 7, the structural elements same as those of the power source supply management unit 606 will be denoted by the same reference numerals and detailed description of such elements will be omitted.

In the example shown in FIG. 7, the switching circuit 606S comprises an OR circuit C3 to which the ignition signal IGN, the external charger signal CHG, and the wake-up signal are supplied, a one-shot trigger circuit C4, to which a signal output from the OR circuit C3 is supplied, a switching circuit SWB configured to be turned on or off by the signal output from a latch circuit FF in which output is set by the signal output from the one-shot trigger circuit C4, and a switch circuit SWA configured to switch connection between the external power 70 and the DC/DC circuit C2.

When at least one of the ignition signal IGN, the external charger signal CHG, and the wake-up signal is turned on, the output from the OR circuit C3 is turned on (=1). When the output from the OR circuit C3 is turned on, the one-shot trigger circuit C4 refers to the rise of the ON signal from the OR circuit C3 and outputs a pulse signal of a predetermined period once. The pulse signal output from the one-shot trigger circuit C4 sets the output of the latch circuit FF to on (=1). The latch circuit FF maintains the set output until the output is reset by the control circuit CTR when the output is set.

After the output of the latch circuit FF is set, the switch circuit SWB and the switch circuit SWA are turned on, and the power source supply voltage supplied from the external power 79 is supplied to the DC/DC circuit C2. The power source supply voltage converted into 5V by the DC/DC circuit C2 is supplied to the control circuit CTR.

When the power source supply voltage is supplied, the control circuit CTR confirms which of the ignition signal IGN, the external charger signal CHG, and the wake-up signal has turned on the switch circuit SWA, and, after confirming which signal has turned on the switch circuit SWA, maintains the reset signal as being turned off and maintains supply of the power source supply voltage.

In this case, if the control circuit CTR fails to confirm which signal has turned on the switching circuit SWA, the control circuit CTR judges that at least one of the one-shot trigger circuit C4 and the latch circuit FF is broken, and outputs a signal notifying the electric control device 71 of the error and stops supply of the power source supply voltage by turning on the reset signal.

When the ignition signal IGN, the external charger signal CHG, and the wake-up signal are turned off, the control circuit CTR turns on (=1) the reset signal, resets the output of the latch circuit FF to be turned off (=0), and turns off the switch circuit SWA and the switch circuit SWB.

Thus, by configuring such that the supply of the power source supply voltage to the control circuit CTR is performed only when at least one of the ignition signal IGN, the external charger signal CHG, and the wake-up signal is turned on, the power consumption of the control circuit CTR can be reduced.

Accordingly, even when the power source supply management unit shown in FIG. 7 is included, it is possible to provide a secondary battery device capable of achieving low power consumption and a vehicle comprising the secondary battery device, as in the secondary battery device and the vehicle comprising the secondary battery device according to the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery device, comprising:
an assembled battery including a plurality of secondary battery cells;
a power source supply management unit configured to receive supply of a power source supply voltage from an external power source and turn on and off the supply of the power source supply voltage; and
a control circuit configured to receive feed from the power source supply management unit and control an operation of the assembled battery and the power source supply management unit,
the power source supply management unit including a timer configured to output an ON signal every period of time set by the control circuit, an OR circuit configured to receive supply of an output signal from the timer, an external signal supplied from outside, and a switching control signal output from the control circuit, and a switch circuit configured to switch output of the power source voltage from the external power source according to an output signal from the OR circuit, the control circuit receiving supply of the output signal from the timer and the signal supplied from the outside, turning on the switching control signal after confirming which of the output signal from the timer or the external signal has turned on the switch circuit and turning off the switching control signal when both of the output signal from the timer and the external signal are turned off.

2. The secondary battery device according to claim 1, wherein the external signal further includes a signal indicating whether an external charger is connected to the secondary battery device.

3. The secondary battery device according to claim 1, further comprising:
an equalization circuit configured to discharge each of said plurality of secondary battery cells; and
an equalization processing portion configured to perform cell balance control of equalizing energy stored in said plurality of secondary battery cells by controlling the equalization circuit, wherein
the control circuit resets the time set in the timer at timing when the equalization processing portion is caused to start cell balance control and at timing when the cell balance control is completed.

4. The secondary battery device according to claim 1, further comprising:
an equalization circuit configured to discharge each of said plurality of secondary battery cells; and
an equalization processing portion configured to perform cell balance control of equalizing energy stored in said plurality of secondary battery cells by controlling the equalization circuit, wherein
the equalization processing portion stops the cell balance control when an instruction signal to continue the cell balance control is not supplied from the control circuit for a predetermined period of time,
the control circuit calculates a power-on time and a power-off time and sets the power-on time and the power-off time in the timer during a first feed from the power source supply management unit, and supplies an instruction signal to continue the cell balance control to the equalization processing portion during a second feed from the power source supply management portion, wherein
the timer stops the first feed to the control circuit after the power-on time has elapsed since the power-on time and the power-off time have been set and starts the first feed after the power-off time has elapsed since the first feed has been stopped, and transmits a signal to the OR circuit to cause the control circuit to perform the second feed every cycle period in the power-off time.

5. The secondary battery device according to claim 4, wherein the power-off time is a time obtained by subtracting the power-on time and a time required for an activating process of the control circuit from a minimum value other than zero in a cell balance time for discharging the energy stored in each of said plurality of secondary battery cells.

6. A secondary battery device comprising:
an assembled battery including a plurality of secondary battery cells;
a power source supply management unit configured to receive supply of a power source voltage from an external power source and turn on and off an output of the power source voltage; and a control circuit configured to receive feed from the power source supply management unit and control the operation of the assembled battery and the power source supply management unit, the power source supply management unit including a timer configured to output an ON signal every period of time set by the control circuit, an OR circuit configured to receive supply of an output signal from the timer and an external signal supplied from outside, a one-shot trigger circuit configured to receive supply of an output signal of the OR circuit, a latch circuit configured to set an output signal upon receipt of an output from the one-shot trigger circuit and reset the output signal upon receipt of a reset signal from the control circuit, and a switch circuit configured to switch output of the power source voltage from the external power source according to the output signal from the latch circuit, the control circuit receiving supply of the output signal from the timer and the external signal, turning off the reset signal after confirming which of the output signal from the timer or the external signal has turned on the switch circuit, and turning on the reset signal when both of the output signal from the timer and the signal supplied from the outside are turned off.

7. The secondary battery device according to claim 6, wherein the external signal further includes a signal indicating whether an external charger is connected to the secondary battery device.

8. The secondary battery device according to claim 6, further comprising:
an equalization circuit configured to discharge each of said plurality of secondary battery cells; and
an equalization processing portion configured to perform cell balance control of equalizing energy stored in said plurality of secondary battery cells by controlling the equalization circuit, wherein
the control circuit resets the time set in the timer at timing when the equalization processing portion is caused to start cell balance control and at timing when the cell balance control is completed.

9. The secondary battery device according to claim 6, further comprising:
an equalization circuit configured to discharge each of said plurality of secondary battery cells; and
an equalization processing portion configured to perform cell balance control of equalizing energy stored in said plurality of secondary battery cells by controlling the equalization circuit, wherein
the equalization processing portion stops the cell balance control when an instruction signal to continue the cell balance control is not supplied from the control circuit for a predetermined period of time,
the control circuit calculates a power-on time and a power-off time and sets the power-on time and the power-off time in the timer during a first feed from the power source supply management unit, and supplies an instruction signal to continue the cell balance control to the equalization processing portion during a second feed from the power source supply management portion, wherein
the timer stops the first feed to the control circuit after the power-on time has elapsed since the power-on time and the power-off time have been set and starts the first feed after the power-off time has elapsed since the first feed has been stopped, and transmits a signal to the OR circuit to cause the control circuit to perform the second feed every cycle period in the power-off time.

10. The secondary battery device according to claim 9, wherein the power-off time is a time obtained by subtracting the power-on time and a time required for an activating process of the control circuit from a minimum value other than zero in a cell balance time for discharging the energy stored in each of said plurality of secondary battery cells.

11. A vehicle comprising the secondary battery device according to claim 1.

12. A vehicle according to claim 11, wherein the external signal includes a signal indicating whether a key has been inserted into an ignition of a vehicle installed with the secondary battery device.

13. A vehicle comprising the secondary battery device according to claim 6.

14. A vehicle according to claim 13, wherein the external signal includes a signal indicating whether a key has been inserted into an ignition of a vehicle installed with the secondary battery device.

* * * * *